United States Patent
Bell et al.

(10) Patent No.: US 7,082,413 B2
(45) Date of Patent: Jul. 25, 2006

(54) SYSTEM AND METHOD FOR AUTHORIZED COMPRESSION OF DIGITIZED MUSIC

(75) Inventors: Alan Edward Bell, San Jose, CA (US); Jeffrey Bruce Lotspiech, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 502 days.

(21) Appl. No.: 09/448,253

(22) Filed: Nov. 24, 1999

(65) Prior Publication Data
US 2002/0161714 A1    Oct. 31, 2002

(51) Int. Cl.
*H04L 4/30* (2006.01)
*H04B 1/66* (2006.01)

(52) U.S. Cl. .................. 705/51; 705/52; 705/53; 705/54; 705/57; 705/58; 380/28; 380/46; 380/54; 380/269; 713/157; 713/176

(58) Field of Classification Search ............. 713/194, 713/157, 176; 705/51–59, 1, 26, 27, 25, 705/71; 380/44, 281, 28, 46, 54, 266; 707/9
See application file for complete search history.

(56) References Cited

U.S. PATENT DOCUMENTS

| | | | | |
|---|---|---|---|---|
| 4,694,491 A | | 9/1987 | Horne et al. ............ 380/20 |
| 5,258,983 A | * | 11/1993 | Lane et al. ............ 713/178 |
| 5,345,505 A | | 9/1994 | Pires .................... 380/20 |
| 5,513,260 A | * | 4/1996 | Ryan et al. ............. 380/3 |
| 5,591,365 A | * | 1/1997 | Shields ................ 219/213 |
| 5,636,292 A | * | 6/1997 | Rhoads ................ 235/382 |
| 5,659,613 A | * | 8/1997 | Copeland et al. ......... 380/3 |
| 5,822,432 A | * | 10/1998 | Moskowitz et al. ....... 380/28 |
| 5,926,624 A | * | 7/1999 | Katz et al. ............ 705/26 |
| 6,188,659 B1 | * | 2/2001 | Mueller et al. ......... 369/59 |
| 6,209,092 B1 | * | 3/2001 | Linnartz .............. 713/176 |
| 6,226,618 B1 | * | 5/2001 | Downs et al. .......... 713/194 |
| 6,289,455 B1 | * | 9/2001 | Kocher et al. ......... 713/194 |
| 6,353,887 B1 | * | 3/2002 | Cotugno et al. ........ 713/165 |
| 6,357,006 B1 | * | 3/2002 | Pham et al. ........... 713/176 |
| 6,591,365 B1 | * | 7/2003 | Cookson .............. 713/176 |
| 2002/0004906 A1 | * | 1/2002 | Rajasekharan et al. ... 713/200 |

FOREIGN PATENT DOCUMENTS

| | | | |
|---|---|---|---|
| JP | 2004022000 A | * | 1/2004 |
| JP | 2004326552 A | * | 11/2004 |
| WO | WO2004/112399 A1 | * | 12/2004 |

OTHER PUBLICATIONS

U.S. Appl. No. 60/116,641, Cookson, filed Jan. 21, 1999.*
Cookson, U.S. Appl. No. 60/116,641.*

* cited by examiner

*Primary Examiner*—James P. Trammell
*Assistant Examiner*—Cristina Owen Sherr
(74) *Attorney, Agent, or Firm*—John L. Rogitz

(57) ABSTRACT

A system and method for enabling authorized music from a CD or DVD to be compressed by a user for the user's own use, but to prevent the recompression of unauthorized music from, e.g., the Internet, includes hashing the music during recording with a cryptographic hash, and then signing the hash with a digital signature derived from the hash. Subsequent unauthorized compression and recompression will destroy the digital signature. Accordingly, music to be recorded is hashed to obtain a test digital signature and if, after hashing, the test digital signature matches the digital signature accompanying the music, compression and recording are allowed to proceed.

13 Claims, 3 Drawing Sheets

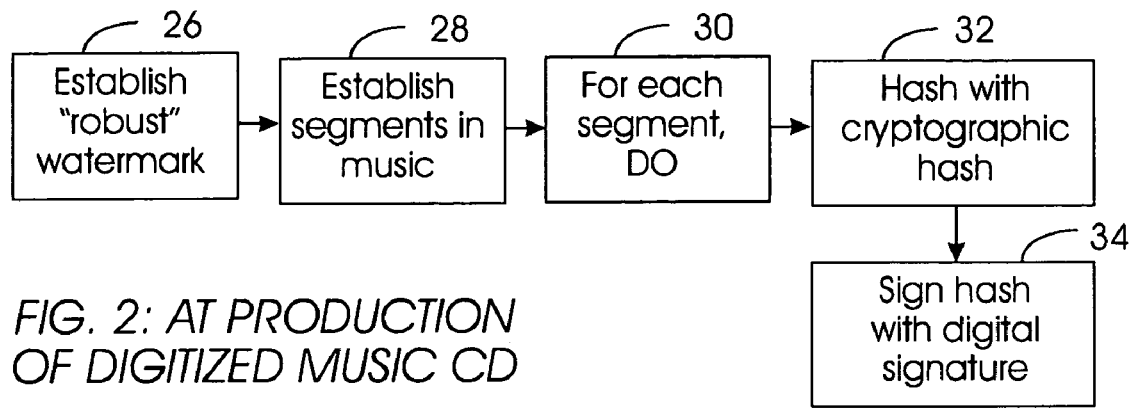
FIG. 2: AT PRODUCTION OF DIGITIZED MUSIC CD

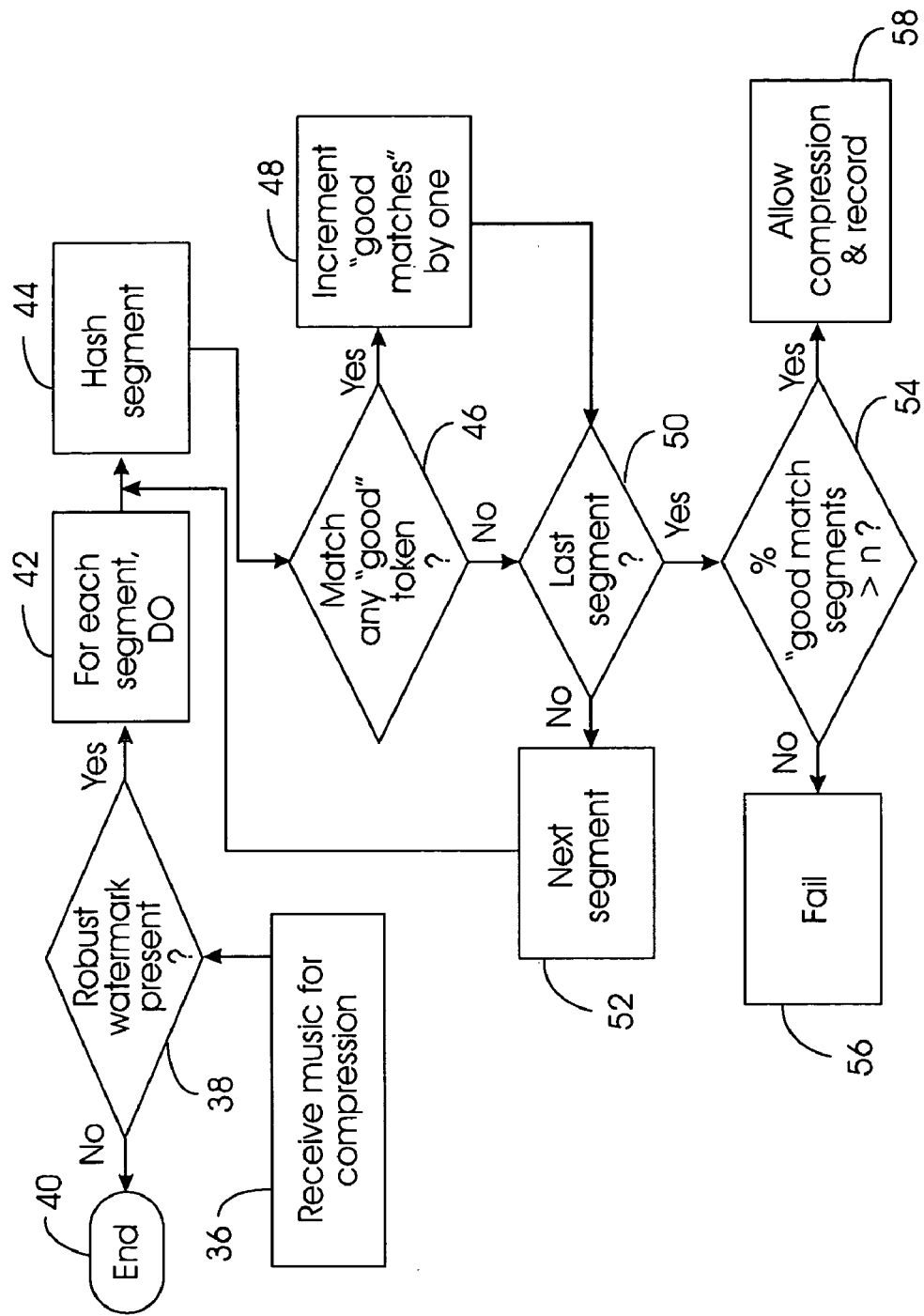
FIG. 3: COMPRESSION TEST

SYSTEM AND METHOD FOR AUTHORIZED COMPRESSION OF DIGITIZED MUSIC

BACKGROUND OF THE INVENTION

1. Field of the Invention

The present invention relates generally to systems and methods for preventing the unauthorized compression and recording of digitized music.

2. Description of the Related Art

The advantages of digitized video and music are numerous. One advantage is that digitized music can be compressed by a purchaser of the music, such that a person's entire music library can be stored on a single digital video disk (DVD). Another advantage of compressed music is that it can be conveniently stored in flash memory for subsequent decompression and playback by a portable music player that has no moving parts and that consequently can be made small for easy portability during activities such as jogging. Yet a further advantage of compressed music is that, being compressed, it is more quickly transmitted over media such as the Internet, compared to uncompressed music.

Unfortunately, however, pirates can take advantage of the last of the above-mentioned advantages to distribute the music over the Internet without the authorization of the copyright owner. In other words, pirates can take advantage of the ease by which compressed music can be distributed over the Internet to distribute the music without paying royalties to the copyright holder. Thus, while it is desirable to permit consumers to compress digitized music that has been properly paid for so that the consumers can use small players such as the one mentioned above, it is equally desirable that consumers cannot re-record music from pirate channels. The problem is not trivial to solve, because it is difficult to ascertain the difference between authorized, uncompressed music from CDs and unauthorized, decompressed music from the Internet.

One solution to the above-noted problem is to record a so-called "fragile" watermark in the prerecorded music on CDs. The fragile watermark, which is supposed to be inaudible but which sometimes is not, is machine-detectable in never-compressed music but gets destroyed by compression, and consequently is not present in subsequently decompressed music. Accordingly, an authorized compression device can determine whether music has the fragile watermark and if it doesn't, can refuse to compress the music.

As recognized herein, not only can the fragile watermark be detected by listeners, but it is also relatively easy to mimic by a hacker. Accordingly, the present invention makes the critical observation that a relatively more secure means is needed to prevent compression of music that has been received from an unauthorized compressed data stream, but to permit compression and subsequent re-recording of music obtained in an authorized transaction.

SUMMARY OF THE INVENTION

A computer-based system for inhibiting unauthorized recording of digitized music includes a cryptography module that includes logic executable by a provider computer. The logic includes, for at least a segment of the music, obtaining an authorized digital signature, and then associating the authorized digital signature with the music. A consumer module is associated with a consumer music player and is executable thereby to undertake logic that includes processing at least the segment of the music to obtain a test digital signature. Only if the test digital signature matches the authorized digital signature is at least one of: compression of the music, and recording of the music, on the consumer music player permitted.

In the preferred embodiment, the cryptography module obtains authorized digital signatures for respective plural segments of the music, and associates the authorized digital signatures with the music. In this embodiment, the consumer module determines test digital signatures for respective plural segments of the music. The consumer module prevents further compression and/or recording of the music unless a predetermined number or percentage of matches exist between test digital signatures and authorized digital signatures.

As set forth in detail below, the music is stored in a data stream on a disk, and the authorized digital signature is associated with the music by storing the authorized digital signature on the disk, apart from the stream, or, if desired, as part of the stream. In a particularly preferred embodiment, the authorized digital signature is tagged with a signature date, and the consumer module processes the music using a current key or an expired key having a key date equal to or later than the signature date.

In another aspect, a computer program storage device includes a program of instructions for determining whether a request to compress and record digitized music should be honored. The program of instructions includes code means for processing at least one segment of the music to obtain a test digital signature. Also, the program includes code means for receiving an authorized digital signature associated with the music, and code means for permitting compression and recording of the music only if at least the test digital signature matches the authorized digital signature.

In still another aspect, a computer program storage device includes a program of instructions for associating digitized music with at least one digital signature derived from at least a segment of the music. The program of instructions includes code means for deriving an authorized digital signature from at least the segment of the music, and code means for storing the music on a recording medium. Moreover, the program includes code means for storing the authorized digital signature on the recording medium along with the music.

In yet another aspect, a method for facilitating the compression and storage, on a personal music player, of digitized music received on a disk in an authorized transaction includes recording the music on the disk along with at least one authorized digital signature derived from the music. The disk is received and engaged with a personal music player compression device. Then, at least one test digital signature is derived from the music. The method includes compressing the music and recording the music on the personal music player only if the test digital signature matches the authorized digital signature.

The details of the present invention, both as to its structure and operation, can best be understood in reference to the accompanying drawings, in which like reference numerals refer to like parts, and in which:

BRIEF DESCRIPTION OF THE DRAWINGS

FIG. 2 is a flow chart of the logic used during production of digitized music CDs; and FIG. 3 is a flow chart of the logic used when a user desires to compress music.

DETAILED DESCRIPTION OF THE PREFERRED EMBODIMENTS

Figure 1:
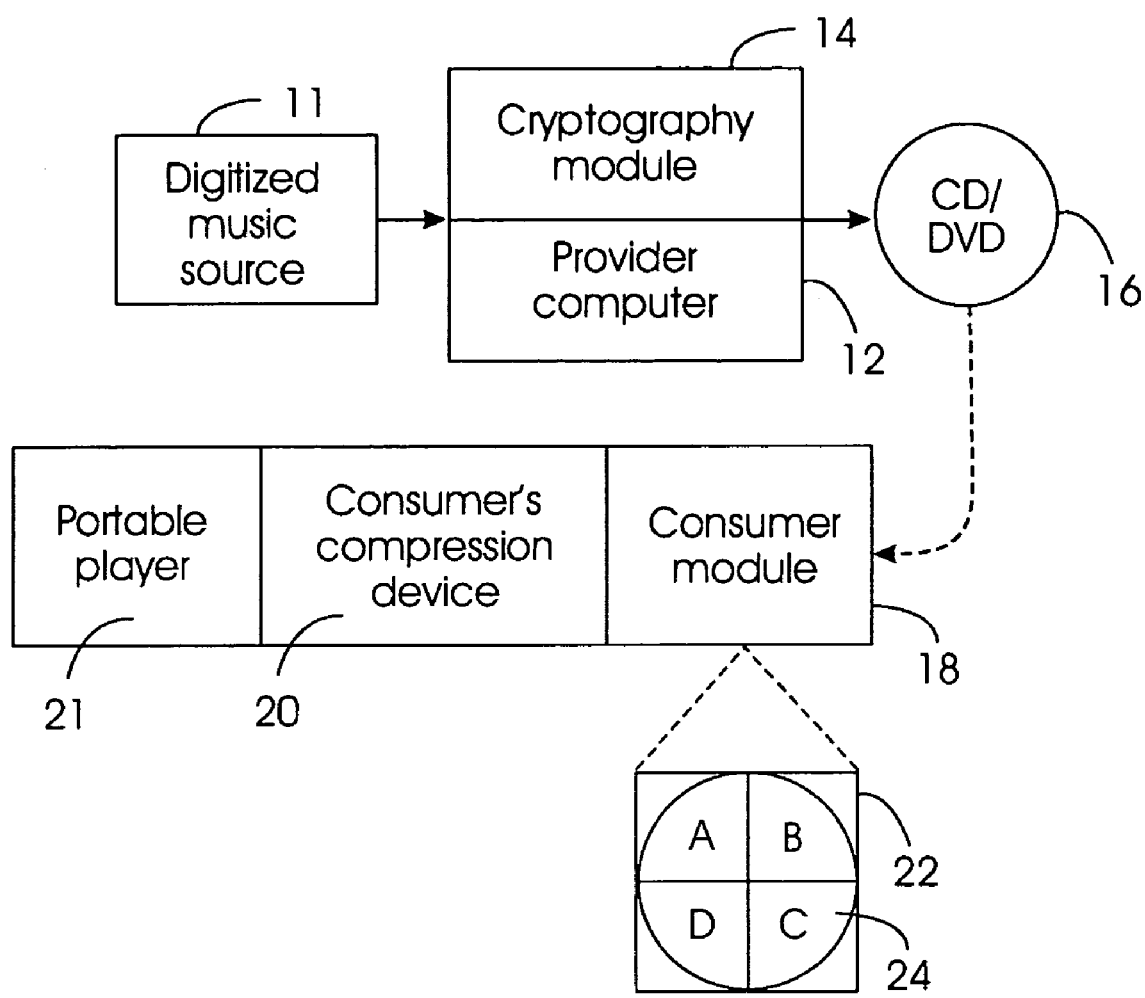
FIG. 1 is a block diagram of the present system.

Referring initially to FIG. 1, a system for compressing digitized data such as music is shown, generally designated 10. In the particular architecture shown, the system 10 includes a digitized music source 11 that sends digitized music to a provider computer 12. In turn, the provider computer 12 executes a software-implemented cryptography module 14 in accordance with the logic below to produce music disks 16, such as CDs or DVDs. A disk 16 can be subsequently provided to a user wishing to compress music from the disk 16. The disk 16 would be tested by a software-implemented compression module 18 of a consumer's compression device 20 to determine whether compression and/or recording of the music onto a portable consumer music player 21 associated with the compression device 20 as indicated in FIG. 1 is authorized in accordance with the logic below.

It is to be understood that the modules 14, 18 may be executed by a processor as a series of computer-executable instructions. The instructions may be contained on a data storage device with a computer readable medium, such as a computer diskette 22 shown in FIG. 1 having a computer usable medium 24 with code elements A–D stored thereon. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled C++ compatible code.

In any case, the flow charts herein illustrate the structure of the modules of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function steps corresponding to those shown.

FIG. 2 shows the logic by which digital music is initially recorded onto the disks 16 to transfer the disks 16 to consumers in authorized transactions. Commencing at block 26, a robust watermark is established on the disk 16. This robust watermark is a digital code which survives compression as is known in the art. Proceeding to block 28, segments in the music are established or defined. For example, a stream of digitized music might be divided into segments of a predetermined number of bytes each, with the last segment being a partial segment if necessary.

Next, at block 30 a DO loop is entered for each segment. At block 32, the segment is hashed with cryptographic hash to derive an authorized digital signature for the segment. In the preferred embodiment, the standard hashing algorithm (SHA) or digital signature algorithm (DSA) can be used, it being understood that other methods for obtaining or deriving digital signatures can be used, provided a digital signature representative of the segment being processed is obtained. Once derived, the music is "signed" with the authorized digital signatures, i.e., the authorized digital signatures are recorded onto the disk 16 with the music, either apart from the music or as part of the music stream, e.g., in the last several waveform samples of a song.

Once recorded, the present invention recognizes that the music can be transferred to a user pursuant to an authorized transaction, such as a sale of the disk 16 directly to the consumer, for authorized re-recording of the music on the portable player 21. The present invention further understands, however, that the music can be distributed to many consumers via, e.g., the Internet in unauthorized transactions, and that a consumer might seek to re-record, onto the portable player 21, the music so distributed.

As still further recognized herein, it is generally the case that music distributed over the Internet is compressed, to facilitate efficient transmission, and that compressed music will not have the same digital signature as the music from which it was derived. Moreover, the present invention realizes that once-compressed music, even after decompression, will not have the same digital signature as the original music, because decompression generally results in at least a few changed bits from the original and even a single changed bit is sufficient to render a different digital signature.

With the above observations in mind, attention is directed to FIG. 3, which sets forth the preferred logic for ascertaining whether the music sought to be compressed and recorded on the portable player 21 has been received pursuant to an authorized transaction or whether it already has been compressed, indicating an unauthorized transaction. Commencing at block 36, the music is received for compression by, e.g., engaging the disk 16 with the device 20.

Moving to decision diamond 38, it is determined whether a robust watermark exists on the disk 16. If not, the logic ends at state 40; otherwise, the logic proceeds to block 42 to enter a DO loop for each segment of the music.

At block 44, the segment under test is hashed with the same function used to derive the authorized digital signatures to obtain a test digital signature. From block 44, the logic proceeds to decision diamond 46, wherein it is determined whether the test digital signature matches any authorized digital signature on the disk 16. If it does, the logic flows to block 48 to increment a "good match" counter by unity. Both compressed and once-compressed, then decompressed music will fail the test at decision diamond 46.

The present invention recognizes that a public key used to encrypt the music might be compromised. When this happens, it could be revoked by well-known "certificate revocation" methods, and a new key issued. However, if this were done old disks 16 that used the old key could no longer be imported into the device 20, even though such importation might be authorized, without the following feature. In the preferred embodiment, each authorized digital signature is tagged with the date of recording of the associated disk 16. Since each compromised key can be given an expiration date, the consumer module 18 can simply retain old keys, and if an authorized digital signature date of a disk 16 sought to be re-recorded is earlier than an old public key that had not expired when the disk 16 was recorded with the music, the old key is used. In this implementation, consequently, certificate revocations need not be used.

From block 48, or from decision diamond 46 if the test there was negative, the logic moves to decision diamond 50 to determine whether the last segment has been tested. If not, the next segment is retrieved at block 52, and the logic loops back to block 44 to hash the segment.

In contrast, when the last segment has been tested, the logic moves from decision diamond 50 to decision diamond 54, to determine whether the number of good matches (or percentage of good matches to overall number of test digital signatures or other equivalent relationship) as indicated by the "good match" counter is at least as great as a predetermined number or percentage. If not, the logic returns "FAIL"

at block 56; otherwise, the logic moves to state 58 to allow compression and/or recording of the music onto the portable player 21.

Although only a single authorized digital signature need be derived from the entire music stream, the above-described segmentation is preferred. This is because, as recognized herein, music disk recording devices use weaker error correcting codes than do CD-ROM disks. Consequently, error correction in music disk recording, although rarely causing audible artifacts, can nonetheless result in uncorrected errors, even a single one of which can change the cryptographic hash. Under these circumstances, the test digital signature of the entire stream would not match the authorized digital signature of the stream. Accordingly, the preferred embodiment divides the stream into segments and allows compression and recording to proceed if most of the segment test digital signatures match respective authorized digital signatures.

While the particular SYSTEM AND METHOD FOR AUTHORIZED COMPRESSION OF DIGITIZED MUSIC as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A computer program storage device including a program of instructions for determining whether a request to compress and record digitized music should be honored, the program of instructions including:
   means for processing at least one segment of the music to obtain a test digital signature by applying a cryptographic hash solely to the segment without applying a user identification;
   means for receiving an authorized digital signature associated with the music; and
   means for permitting compression and recording of the music only if at least the test digital signature matches the authorized digital signature.

2. The device of claim 1, further comprising:
   means for determining test digital signatures for respective plural segments of the music; and
   means for preventing at least one of: compression of the music, and recording of the music, unless a predetermined number or percentage of matches exist between test digital signatures and authorized digital signatures.

3. A method for facilitating the compression and storage, on a personal music player, of digitized music received on a disk in an authorized transaction, comprising the acts of:
   recording the music on the disk along with at least one authorized digital signature derived solely by applying a cryptographic hash to the music without recording a user identification on the disk;
   receiving the disk;
   engaging the disk with a personal music player compression device;
   deriving at least one test digital signature from the music; and
   compressing the music and recording the music on the personal music player only if the test digital signature matches the authorized digital signature.

4. The method of claim 3, further comprising the acts of:
   deriving plural authorized digital signatures from respective segments of the music; and
   recording the plural authorized digital signatures on the disk.

5. The method of claim 4, further comprising the acts of:
   deriving plural test digital signatures from plural segments of the music; and
   undertaking the compressing and recording act only if a predetermined number or percentage of matches exist between test digital signatures and authorized digital signatures.

6. The method of claim 3, wherein the authorized digital signature is stored on the disk, apart from the music.

7. The method of claim 3, wherein the authorized digital signature is stored on the disk in the music.

8. The method of claim 3, wherein the authorized digital signature is tagged with a signature date, and the deriving act includes processing the music using a current key or an expired key having a key date equal to or later than the signature date.

9. The method of claim 3, further comprising recording a robust watermark on the disk.

10. A computer program storage device including a program of computer readable instructions for determining whether a request to compress and record digitized music should be honored, the program of instructions undertaking method acts comprising:
    processing at least one segment of the music and only the segment to obtain a test digital signature;
    receiving an authorized digital signature associated with the music; and
    permitting compression and recording of the music only if at least the test digital signature matches the authorized digital signature.

11. The device of claim 10, wherein the method acts further comprise:
    determining test digital signatures for respective plural segments of the music; and
    preventing at least one of: compression of the music, and recording of the music, unless a predetermined number or percentage of matches exist between test digital signatures and authorized digital signatures.

12. A method for facilitating die compression and storage, on a personal music player, of digitized music received on a disk in an authorized transaction, comprising the acts of:
    engaging the disk with a personal music player compression device;
    deriving at least one test digital signature solely from the music; and
    compressing the music and recording the music on the personal music player only if the at least one rest digital signature matches at least one digital signature received on the disk without checking for a user identification.

13. The method of claim 12, further comprising the acts of:
    deriving plural authorized test digital signatures from respective segments of the music; and
    comparing the test digital signatures with authorized digital signatures on the disk.

* * * * *